United States Patent Office 3,704,244
Patented Nov. 28, 1972

3,704,244
N-LOWER ALKYL-SUBSTITUTED N'-[β-(2',5'-DI-PHENYLPYROLYL - 1')] ETHYLHOMOPIPER-AZINES
Akihide Kohda, Gifu, and Shigeharu Kohno, Tohru Takahashi, and Hachiro Sugimoto, Tokyo, Japan, assignors to Eisai Co., Ltd., Tokyo, Japan
No Drawing. Filed Sept. 21, 1970, Ser. No. 74,165
Int. Cl. C07d 27/26, 53/02
U.S. Cl. 260—326.9                           8 Claims

ABSTRACT OF THE DISCLOSURE

New compounds, N-lower alkyl-substituted N'-[β-(2', 5' - diphenylpyrrolyl-1')]ethylhomopiperazines and pharmacologically acceptable acid-addition salts thereof. The compounds possess not only anti-histamine activity but also antagonising effect to the S. R. S. (Slow Reacting Substance). They are therapeutically useful for bronchodilation and for treatment of asthma attack. The compounds are advantageously administrated in a form of their pharmacologically acceptable water soluble salts.

This invention relates to N-lower alkyl-substituted N'-[β - (2',5'-diphenylpyrrolyl-1')]ethylhomopiperazines, the new compounds, and pharmacologically acceptable acid-addition salts thereof. The invention further relates to a process for preparing the compounds and acid-addition salts thereof, and also to the therapeutical use thereof for broncho-dilation etc.

N - lower alkyl - substituted N'- [β-(2',5'-diphenylpyrrolyl-1')]ethylhomopiperazine of the present invention has the formula

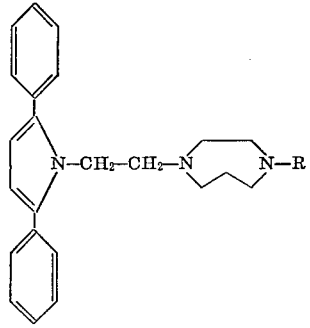

wherein R is lower alkyl group containing 1–4 carbon atoms.

The new compounds of the above formula are oily basic substances insoluble in water, while their acid-addition salts are easily soluble in water.

We have now found that the new N-lower alkyl-substituted [β - (2',5 '- diphenylpyrrolyl-1')]ethylhomopiperazines having the aforementioned formula and their pharmacologically acceptable acid-addition salts show an outstatnding pharmacological effect such as broncho-dilating activity. They therefore are useful for the treatment of patients suffering from asthma attacks and the like.

Many anti-histamine compounds have been tested for their pharmacological activity as broncho-dilating agents for bronchiectasis, and it has been found that certain compounds amongst them show a desirable effect. They are thus useful for treatment of asthma and the like. The results observed however are still far from perfect.

In recent years, W. E. Brocklehurst, noted that a substance called S. R. S. (Slow Reacting Substance) causes contraction of the removed bronchial muscle of patients suffering from asthma, suggested that the said substance, i.e., S. R. S. is an important spasmogen leading to bronchial contraction under allergenic asthma attack [comp. W. E. Brocklehurst, Progress in Allergy, 6, pp. 539–558 (1962)]. The S. R. S. had been obtained by C. H. Kellaway and E. R. Trethewie through addition of antigen to a sensitized organ [comp. Journal of Experimental Physiology, 30, pp. 121–145 (1940)].

It is evident therefore that it is preferable to administer a substance possessing not only an anti-histamine effect but also an antagonist the effect for S. R. S. in order to treat patients suffering from asthma attacks.

It is surprising that N-lower alkyl-substituted N'-[β-(2',5' - diphenylpyrrolyl - 1')]ethylhomopiperazine and pharmacologically acceptable acid-addition salts thereof possess not only anti-histamine activity but also anti-S. R. S. actitvity.

By the term "pharmacologically permissible acid-addition salts" appearing throughout the specification and claims of the present invention refers to those acids known to those skilled in the art such as the inorganic acid salts, for example, sulfate, phosphate, hydrohalides such as hydrochloride, hydrobromide and hydroiodide; sulfamide and so on, as well as the organic acid salts such as citrate, maleate, malate, succinate, tartrate, acetate and so on, but do not limit the invention.

In a word, present invention has an object of providing the new N-lower alkyl-substituted N'-[β-(2',5'-diphenylpyrrolyl-1')]ethylhomopiperazines and pharmacologically acceptable acid-addition salts thereof.

A further object of the present invention is to provide the methods for utilizing the said compounds as bronchodilating agents.

A still further object of the present invention is to provide a method of treating patients suffering from asthma attacks utilizing the said compounds.

The new compounds of the present invention can advantageously be prepared by the condensation reaction of 1,2-dibenzoylethane and N-lower alkyl-substituted N'-(β-aminoethyl)homopiperazines according to the following schematic equation:

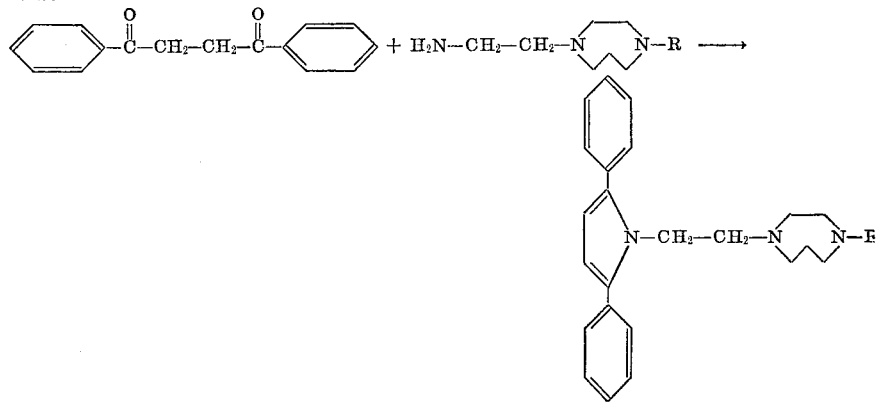

In the formulae, R is alkyl group containing 1–4 carbon atoms.

The above-mentioned reaction may be carried out with or without an inert organic solvent such as benzene, toluene, xylene, nitrobenzene or the like.

In tests for evaluating pharmacological activity, that is, broncho-dilating activity, there were used N-methyl-N'-[β-(2',5' - diphenylpyrrolyl-1')]ethylhomopiperazine dihydrochloride, hereinafter called Compound A, as a typical compound of the present invention, on the one hand, and a commercially available Homochlorocyclizine consisting of 1-(p-chlorobenz-hydryl)-4-methyl homopiperazine dihydrochloride hereinafter called Compound B as the comparative specimen, on the other hand.

Briefly stated, the inhibition activity of Compounds A and B against the muscular contraction of the pieces of isolated guinea pig ileum is conveniently shown by the term "percent inhibition." The percent inhibition may be obtained by noting the difference between the degree of muscular contraction of the piece of isolated guinea pig ileum caused by treating the pieces with the S. R. S. or histamine alone as spasmogen and the degree of muscular contraction of the piece of isolated guinea pig ileum caused by treating first with Compound A or B as the dilating agent and then with the S. R. S. or histamine as spasmogen.

Illustratively, the actual muscular contraction of the piece of guinea pig ileum treated with S. R. S. or histamine alone may be considered as 100 percent concentration.

Calculate the relative percent muscular contraction ($b$) from the muscular contraction of the piece caused by the pre-treatment with Compound A or B and then with the S. R. S. as aforementioned, in proportion to the 100 percent muscular contraction ($a$).

Then, the difference between the percent muscular contractions ($a$) and ($b$) will directly show the percent inhibition of Compound A or B.

Each of Compounds A and B was used in a form of the solution in Tyrode solution.

The S. R. S. containing solution used in the tests was prepared as follows:

Guinea pigs weighing about 250–350 grams were sensitized by injecting egg-white albumin. After 4–6 weeks, the lungs from the sensitized animals were isolated and sliced into pieces.

The sliced pieces of the lungs were again sensitized with egg-white albumin at 37° C. for 10 minutes. They were afterwards removed by filtration to obtain the expected S. R. S. containing solution as the filtrate.

Muscular contraction of pieces of isolated guinea pig ileum in Tyrode solution caused by the S. R. S. containing solution was evaluated in accordance with Magnus method and the results were utilized as the control figure of the 100 percent contraction.

Muscular contraction was caused by treating the piece with the S. R. S. containing solution containing atropine sulfate in a concentration of $5 \times 10^{-8}$ grams/ml. and Mepiramin in a concentration of $1 \times 10^{-7}$ grams/ml.

The contraction inhibiting activity of Compounds A and B were observed with pieces of the isolated guinea pig ileum respectively pre-treated with Compounds A and B in a concentration of $1 \times 10^{-4}$ grams/ml. and then treated with the aforementioned S. R. S. containing solution containing atropine sulfate and Mepiramin at the concentrations aforementioned.

There were thus actually obtained a contraction of 62.3 percent with Compound A and 100 percent with Compound B, in proportion to the control figure of the 100 percent contraction.

At the same time, the contraction inhibiting activities of Compounds A and B against the contraction of the isolated pieces of guinea pig ileum caused by treating with histamine at a concentration of $1 \times 10^{-7}$ grams/ml. was determined in accordance with the evaluation of the contraction inhibiting activity of the S. R. S. containing solution containing only atropine sulfate at a concentration of $5 \times 10^{-8}$ grams/ml.

From the data, the percent inhibitions of Compounds A and B were calculated and are given in the following table.

|  | Percent contraction (found) | Percent inhibition (calculated) |
| --- | --- | --- |
| Spasmogen: | | |
| S.R.S. | 100 | 0 |
| Histamine | 100 | 0 |
| Compounds under test: | | |
| (a) For S.R.S.: | | |
| Compound A | 62.3 | 37.7 |
| Compound B | 100 | 0 |
| (b) For histamine: | | |
| Compound A | 6.9 | 93.1 |
| Compound B | 9.0 | 91.0 |

In the table, it will be noted that the inhibiting activity of Compound A according to the present invention against the contraction caused by the histamine is almost the same as that of Compound B, i.e., Homochlorocyclizine, while Compound A shows remarkable contraction inhibiting activity against the contraction caused by the S. R. S. containing solution, and is superior to that presented by Compound B.

It was also confirmed that by the Schultz-Dale method, Compound A according to the present invention shows a powerful contraction-inhibiting activity on the isolated bronchial muscle.

A clinical test was carried out with 50 patients suffering from asthma in which 30–50 mgs. per day, that is, 3–5 tablets each contains 10 mgs. of N-methyl-N'-[β-(2',5'-diphenylpyrrolyl-1')]ethylhomopiperazine dihydrochloride were orally administrated per day to each patient. The results of the therapeutical activity thus observed are as follows:

|  | Persons |
| --- | --- |
| Superior | 31 |
| Good | 9 |
| Fair | 6 |
| Faint | 4 |

From the data, it will be appreciated that the condition of 46 persons amongst 50 persons treated was improved.

$LD_{50}$ toxicity of Compound A in the oral administration to mice was found above 500 mgs./kg.

The compounds of the present invention may be administrated in various of the usual pharmaceutical forms. For oral administration, for example, the compound can be given in any form such as tablet, powder, granule, capsule, or liquid medicine. Aerosol preparation is a convenient form for inhalation, as the active compound may immediately be applied to bronchi.

The compounds may also be administered by injection or in a form of suppository.

It has been found that the efficacy of the suppository preparation is almost equivalent to that of the injection, and accordingly, the same is advantageous to use for the treatment of infantile asthma.

The compounds of the present invention are administrated orally in a form of the dihydrochloride in dosages of 20–150 mgs./day and preferably 20–60 mgs./day.

The invention is illustrated more concretely by the following examples.

EXAMPLE 1

Preparation of N-methyl-N'-[β-(2',5'-diphenylpyrrolyl-1')]ethylhomopiperazine 8.7 grams of 1,2-dibenzoylethane and 8 grams of N-methyl-N'-(β-aminoethyl)-homopiperazine were dissolved in 100 ml. of xylene. The solution thus obtained was refluxed for 3 hours. When the reaction was over, the reaction mixture was extracted with 150 ml. of a 10% aqueous hydrochloric acid.

The extract was made alkaline with a 10% aqueous solution of caustic soda. A layer of oily substance which separated out was recovered, taken into 200 ml. of benzene and dried with potassium carbonate. After removal of the potassium carbonate, the benzene was distilled.

The residue remained was subjected to vacuum distillation. There was obtained the contemplated base as a fraction having the boiling point of 190°–200° C. at 0.15 mm. Hg. The base was dissolved in 150 ml. of isopropanol. Dry hydrogen chloride was bubbled through the solution under ice-cooling. The crystal which separated out was recovered by filtration, dried in air and finally recrystallized from ethanol.

12.8 grams of the product aimed at were obtained as its dihydrochloride melting at 200°–202° C. Yield was 75.0%.

Elementary analysis gave.—Calculated (percent) as $C_{24}H_{29}N_3 \cdot 2HCl$: C, 66.66; H, 7.23; N, 9.72. Found (percent): C, 66.40; H, 7.37; N, 9.59.

EXAMPLE 2

Preparation of N-n-propyl-N'-[β-(2',5'-diphenylpyrrolyl-1')]ethylhomopiperazine 11.4 grams of 1,2-dibenzoylethane and 25.9 grams of N-n-propyl-N'-(β-aminoethyl)-homopiperazine were dissolved in 200 ml. of toluene. The resulting solution was further worked up in accordance with the procedure mentioned in the preceding Example. 34.0 grams of dihydrochloride of the contemplated compound melting at 198°–202° C. were thus obtained. Yield was 74.0%.

Elementary analysis gave.—Calculated (percent) as $C_{25}H_{31}N_3 \cdot 2HCl$: C, 67.81; H, 7.66; N, 9.13. Found (percent): C, 67.82; H, 7.62; N, 8.87.

EXAMPLE 3

Preparation of N-n-butyl-N'-[β-(2',5'-diphenyl pyrrolyl-1')]ethylhomopiperazine 11.4 grams of 1,2-dibenzoylethane and 27.9 grams of N-n-butyl-N'-(β-aminoethyl)-homopiperazine were dissolved in 200 ml. of xylene. The resulting solution was refluxed for 3 hours. After the reaction was completed, the reaction mixture was extracted with a 10% aqueous hydrochloric acid.

The extract was made alkaline with a 10% aqueous solution of caustic soda.

Oily substance separated out was extracted with 200 ml. of benzene and dried with potassium carbonate. After removal of the solid potassium carbonate by filtration, the benzene was distilled off. The residue was dissolved in ethyl acetate and purified by passing the solution through a column filled with alumina.

The ethyl acetate was distilled off and the residue was then dissolved in acetone. To the acetone solution was added an amount of a 47% aqueous solution of hydrobromic acid and the resulting solution was allowed to stand.

The crystal separated out was recovered by filtration and dried in air.

There were obtained 39.6 grams of dihydrobromide of the contemplated substance having the melting point of 217°–220° C. Yield was 71.0%.

Elementary analysis gave.—Calculated (percent) as $C_{26}H_{33}N_3 \cdot 2HBr$: C, 57.56; H, 6.62; N, 7.46. Found (percent): C, 57.36; H, 6.64; N, 7.46.

EXAMPLE 4

Preparation of tablet 150 grams of N-methyl-N'-[β-(2',5'-diphenylpyrrolyl-1')]ethylhomopiperazine dihydrochloride were incorporated with 1,700 grams of cornstarch and the blend obtained was sifted through a 30 mesh sieve.

A paste was separately prepared with 50 grams of cornstarch and 300 ml. of distilled water.

The blend was thoroughly kneaded with the aforementioned paste, and the whole was sifted through a 4 mesh sieve and dried at 50° C. for 15 hours.

The grains of the dried mass were made on a granulating machine and sifted through a 16 mesh sieve.

The resulting granules were coated with a mixture consisting of 25 grams of stearic acid, 150 grams of cornstarch and 50 grams of talc. The whole was then sifted through a 40 mesh sieve.

Tablets each containing 10 mgs. of the dihydrochloride as active ingredient were then made with the granules in accordance with the conventional procedure known in the art.

EXAMPLE 5

Preparation of aqueous solution for injection 50 grams of N-methyl-N'-[β-(2',5'-diphenylpyrrolyl-1')]ethylhomopiperazine dihydrochloride were dissolved in a portion of the predetermined quantity of distilled water carefully prepared for this specific purpose. The solution was made up to 10 liters with addition of the remaining distilled water. The solution was made isotonic with addition of an appropriate amount of the physiological salt solution, filtered through a glass filter.

Each 2 ml. fraction of the filtered solution was filled into ampoule. The filled ampoules were sealed and sterilized at 121° C. for 20 minutes in an autoclave at 10 lbs./in.$^2$ and were immediately dipped in a cold water bath. The ampoules thus obtained are ready for therapeutical use.

EXAMPLE 6

Preparation of an aqueous solution for oral administration

To a mixture consisting of

| | | |
|---|---|---|
| N - methyl - N'-[β-(2',5'-diphenylpyrrolyl-1')]ethyl homopiperazine dihydrochloride | grs | 5.0 |
| Cane sugar | grs | 200.0 |
| Glycol | ml | 200.0 |
| Ethyl p-oxybenzoate | gr | 1.0 |
| Artificial orange essence | ml | 0.1 |
| Essential oil of orange | ml | 0.7 | was added distilled water to make up 1000 ml. of the total volume.

When administration, the solution should thoroughly be shaken, and a 1–2 teaspoonful quantity of the solution may orally be given per day.

EXAMPLE 7

Preparation of rectal suppository 300 grams of cetyl pulmitate and 695 grams of cacao butter were molten together. The molten mass was cooled to 50° C. At this temperature, there was added 25 grams of N - methyl - N'-[β-(2',5'-diphenylpyrrolyl-1')]ethylhomopiperazine dihydrochloride. The whole was stirred well to yield a homogeneous phase, and from which suppositories to be used for rectum were prepared by molding as usual, each having about 2 grams.

EXAMPLE 8

Aerosol preparation

A mixture was prepared, each 15 mls. of which contained:

| | Grams |
|---|---|
| N - methyl - N'-[β-(2',5'-diphenylpyrrolyl-1')]ethylhomopiperazine dihydrochloride | 0.05 |
| 2-octyl decanol | 0.02 |
| Yolk lecithin | 0.03 |
| Orthophosphoric acid trioleyl ester | 0.02 |
| A propellant consisting of dichlorodifluoromethane plus trichloromonofluoromethane (50: 50) | Balance |

The mixture was charged in a small pressure vessel provided with a spraying device. The content may be employed for inhalation for treatment of acute asthma attack.

What we claim is:

1. N-lower alkyl-substituted N-[β-(2′,5′-diphenylpyrrolyl-1′)]ethylhomopiperazine of the formula

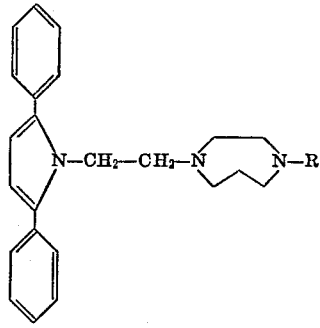

wherein R is alkyl group containing 1–4 carbon atoms as well as pharamacologically acceptable acid-addition salts thereof.

2. N - methyl - N′[β-(2′,5′-diphenylpyrrolyl-1′)]ethylhomopiperazine and pharmacologically acceptable acid-addition salts thereof.

3. N - n-propyl-N′-[β-(2′,5′-diphenylpyrrolyl-1′)]ethylhomopiperazine and pharmacologically acceptable acid addition salts thereof.

4. N - n-butyl-N′-[β-(2′,5′-diphenylpyrrolyl-1′)]ethylhomopiperazine and pharmacologically acceptable acid addition salts thereof.

5. N - n-propyl-N′-[β-(2′,5′-diphenylpyrrolyl-1′)]ethylhomopiperazine hydrochloride.

6. N - n-butyl-N′-[β-(2′,5′-diphenylpyrrolyl-1′)]ethylhomopiperazine hydrochloride.

7. N - methyl - N′-[β-(2′,5′-diphenylpyrrolyl-1′)]ethylhomopiperazine hydrochloride.

8. N - n-butyl-N′-[β-(2′,5′-diphenylpyrrolyl-1′)]ethylhomopiperazine hydrobromide.

References Cited

UNITED STATES PATENTS 3,225,061   12/1965   Braus et al. _____ 260—326.9

ALEX MAZEL, Primary Examiner

JOSEPH A. NARCAVAGE, Assistant Examiner

U.S. Cl. X.R.

424—274